United States Patent
Kim et al.

(10) Patent No.: US 10,989,961 B2
(45) Date of Patent: Apr. 27, 2021

(54) BACKLIGHT UNIT AND DISPLAY DEVICE

(71) Applicant: LG Display Co., Ltd., Seoul (KR)

(72) Inventors: KiSeong Kim, Paju-si (KR);
HyeokJoon Yoon, Paju-si (KR);
SeungJu Gwon, Paju-si (KR);
Donghwi Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/696,923

(22) Filed: Nov. 26, 2019

(65) Prior Publication Data
US 2020/0183232 A1 Jun. 11, 2020

(30) Foreign Application Priority Data

Dec. 6, 2018 (KR) .................. 10-2018-0156352
Oct. 28, 2019 (KR) .................. 10-2019-0134430

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133605* (2013.01); *G02F 1/133607* (2021.01); *G02F 1/133614* (2021.01); *G02F 2201/08* (2013.01); *G02F 2202/28* (2013.01)

(58) Field of Classification Search
CPC ......... G02F 1/133606; G02F 1/133603; G02F 1/133605
USPC ........................................................ 362/84
See application file for complete search history.

(56) References Cited

U.S. PATENT DOCUMENTS

| 7,784,954 B1 * | 8/2010 | Coleman ................ G02B 5/021 362/19 |
| 8,033,706 B1 * | 10/2011 | Kelly ................ G02F 1/133606 362/607 |
| 8,179,034 B2 * | 5/2012 | Potts ..................... B82Y 30/00 313/504 |
| 10,810,917 B2 * | 10/2020 | Fattal ................ G02F 1/133606 |

(Continued)

FOREIGN PATENT DOCUMENTS

| KR | 10-2009-0060067 A | 6/2009 |
| KR | 10-2018-0046467 A | 5/2018 |

OTHER PUBLICATIONS

Combined Search and Examination Report, United Kingdom Patent Application No. 1917812.8, dated Jun. 8, 2020, 6 pages.

*Primary Examiner* — Bryon T Gyllstrom
(74) *Attorney, Agent, or Firm* — Fenwick & West LLP

(57) ABSTRACT

In an embodiment, a display device comprises a display panel and a backlight unit. The backlight unit comprises a printed circuit, a light-emitting device on the printed circuit, and a transparent film including a holographic film. The holographic film includes at least an optical pattern overlapping the light-emitting device and modifying angle of a portion of light emitted by the light-emitting device. The backlight unit further comprises a light output pattern, where the portion of light with the modified angle passes through the light output pattern toward the display panel. The light output pattern may have a refractive index greater than a refractive index of the transparent film such that a refraction angle of the portion of light exiting the light output pattern is less than the incidence angle of the portion of light entering the light output pattern.

22 Claims, 17 Drawing Sheets

(56) References Cited

U.S. PATENT DOCUMENTS

| | | | |
|---|---|---|---|
| 2004/0080938 A1* | 4/2004 | Holman | G02F 1/133605 362/231 |
| 2007/0110386 A1* | 5/2007 | Chiang | G02F 1/133606 385/147 |
| 2007/0236628 A1* | 10/2007 | Epstein | G02B 5/0242 349/67 |
| 2008/0043490 A1* | 2/2008 | Coleman | G02F 1/133606 362/623 |
| 2008/0107993 A1* | 5/2008 | Wolk | B41M 5/38214 430/200 |
| 2012/0037943 A1* | 2/2012 | Verschuren | G02F 1/133606 257/98 |
| 2012/0176423 A1* | 7/2012 | Nagato | G02F 1/133526 345/690 |
| 2020/0183232 A1* | 6/2020 | Kim | G02F 1/133605 |

\* cited by examiner

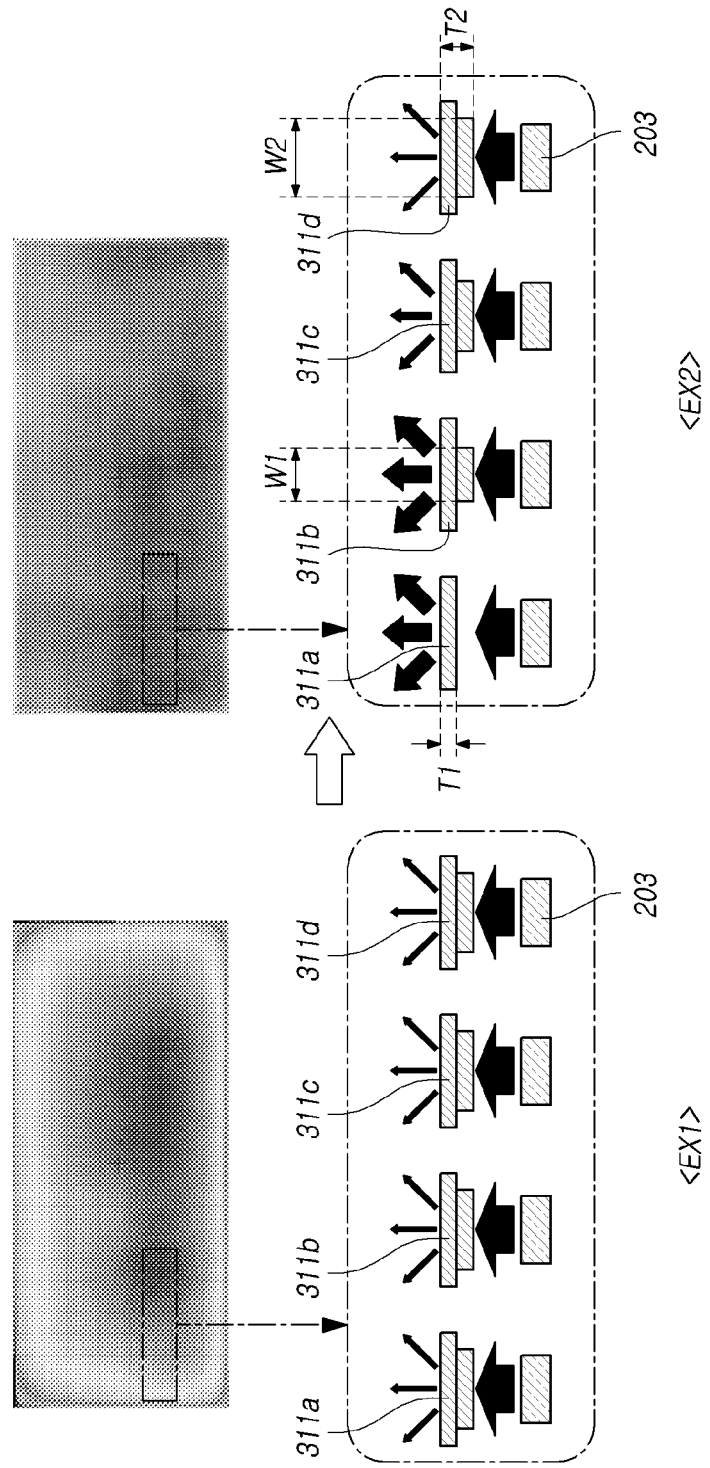

<REAR VIEW OF HOLOGRAPHIC FILM>

FIG. 10

| CLASSIFICATION | | | |
|---|---|---|---|
| SHAPE | Dome #1 | Dome #2 | TRAPEZOID |
| VIEWING ANGLE CHARACTERISTICS | REALIZATION OF GENERAL VIEWING ANGLE | REALIZATION OF WIDE VIEWING ANGLE CHARACTERISTICS (INCREASE IN VIEWING ANGLE AND LUMINANCE) | REALIZATION OF NARROW VIEWING ANGLE CHARACTERISTICS (INCREASE IN FRONT LUMINANCE) |

| CLASSIFICATION | CASE #1 | CASE #2 |
|---|---|---|
| SIMULATION IMAGE |  |  |
| LIGHT EFFICIENCY | 100% | 127% |

BACKLIGHT UNIT AND DISPLAY DEVICE

CROSS REFERENCE TO RELATED APPLICATIONS

This application claims priority from Republic of Korea Patent Application No. 10-2018-0156352, filed on Dec. 6, 2018, and Republic of Korea Patent Application No. 10-2019-0134430, filed on Oct. 28, 2019, all of which are hereby incorporated by reference for all purposes as if fully set forth herein.

BACKGROUND

Field of the Disclosure

Embodiments of the present invention relate to a backlight unit and a display device.

Discussion of the Related Art

With advancement in information-oriented society, requirements for display devices displaying an image have increased, and various types of display devices such as a liquid crystal display device and an organic light emitting display device have been widely utilized.

A liquid crystal display device among such display devices includes a display panel and a light source device such as a backlight unit that supplies light to the display panel.

Therefore, the thickness of the display device can increase due to the backlight unit. When the thickness of the backlight unit is decreased, there is a problem in that a sufficient optical gap between the light source and the display panel will not be ensured and thus image quality will decrease.

SUMMARY

In various embodiments, a display device comprises a display panel and a backlight unit. The backlight unit comprises a printed circuit, a light-emitting device on the printed circuit, and a transparent film including a holographic film on a bottom surface of the transparent film facing the printed circuit. The holographic film includes at least an optical pattern overlapping the light-emitting device and modifying angle of a portion of light emitted by the light-emitting device. The backlight unit further comprises a light output pattern on an upper surface of the transparent film, the portion of light with the modified angle passing through the light output pattern toward the display panel. The light output pattern has a refractive index greater than a refractive index of the transparent film such that a refraction angle of the portion of light exiting the light output pattern is less than the incidence angle of the portion of light entering the light output pattern.

In an embodiment, the display device further comprises a coating layer on the transparent film, the coating layer having a refractive index lower than the refractive index of the transparent film.

In an embodiment, the optical pattern modifies an angle of another portion of the light emitted by the light-emitting device, the coating layer reflecting the other portion of light with the modified angle toward the bottom surface of the transparent film.

In an embodiment, the coating layer overlaps the light output pattern.

In an embodiment, the portion of light with the modified angle passing through the light output pattern further passes through the coating layer.

In an embodiment, an upper surface of the coating layer is flat.

In an embodiment, the holographic film further comprises a base film between the bottom surface of the transparent film and the optical pattern, the base film having a refractive index lower than a refractive index of the optical pattern.

In an embodiment, the plurality of optical patterns is disposed in a lattice shape on a bottom surface of the base film.

In an embodiment, the refractive index of the base film is equal to or lower than the refractive index of the transparent film.

In an embodiment, the optical pattern is a diffraction pattern, the refractive index of the optical pattern greater than the refractive index of the transparent film.

In an embodiment, the light output pattern has an elliptical shape. A semi-major axis of the elliptical shape may equal a semi-minor axis of the elliptical shape. In another embodiment, a semi-major axis of the elliptical shape is greater than a semi-minor axis of the elliptical shape.

In an embodiment, an upper surface of the light output pattern is parallel to a lower surface of the light output pattern. The light output pattern may have a trapezoidal shape.

In an embodiment, the display device further comprises a cover bottom under the printed circuit, and an adhesive tape bonding the printed circuit to the cover bottom.

In an embodiment, the holographic film includes a first plurality of optical patterns in an area overlapping the light-emitting device and a second plurality of optical patterns in another area overlapping space between light-emitting devices, the first plurality of optical patterns having a density greater than a density of the second plurality of optical patterns.

In an embodiment, the display device further comprises a reflection film that accommodates and exposes the light-emitting device, the reflection film having a height greater than a height of the light-emitting device and configured to reflect light emitted from the light-emitting device.

In various embodiments, a backlight unit comprises a printed circuit, a light-emitting device on the printed circuit, and a transparent film including an optical pattern on a bottom surface of the transparent film facing the printed circuit, the optical pattern overlapping the light-emitting device and modifying angle of a portion of light emitted by the light-emitting device. The backlight unit further comprises a diffusion film on the transparent film, and a light output pattern on an upper surface of the transparent film and under the diffusion film, the portion of light having the modified angle passing through the light output pattern toward the diffusion film, the light output pattern having a refractive index greater than a refractive index of the transparent film such that a refraction angle of the portion of light exiting the light output pattern is less than the incidence angle of the portion of light entering the light output pattern.

In an embodiment, the backlight unit further comprises a coating layer between the transparent film and the diffusion film, the coating layer having a refractive index lower than the refractive index of the transparent film.

In an embodiment, the backlight unit further comprises a color conversion sheet on the diffusion film, and one or more optical sheets on the color conversion sheet.

In various embodiments, a backlight unit comprises a plurality of light sources disposed on a printed circuit. The backlight unit further comprises a reflection film disposed in at least an area different than another area in which the plurality of light sources is disposed on the printed circuit. The backlight unit further comprises a light source protecting portion disposed on the plurality of light sources and the reflection film. The backlight unit further comprises a transparent film disposed on the light source protecting portion. The backlight unit further comprises a plurality of light blocking patterns disposed at positions corresponding to the plurality of light sources on a bottom surface of the transparent film, wherein an air gap is present between the plurality of light blocking patterns and the light source protecting portion.

In an embodiment, a thickness of a central portion in at least one of the plurality of light blocking patterns is larger than a thickness of a peripheral portion.

In an embodiment, the plurality of light blocking patterns includes a first light blocking pattern disposed in a peripheral area of the display panel and a second light blocking pattern disposed in a central area of the display panel, and wherein a thickness of the first light blocking pattern is less than a thickness of the second light blocking pattern or an area of the first light blocking pattern is less than an area of the second light blocking pattern.

In an embodiment, the backlight unit further comprises an adhesive layer disposed between the light source protecting portion and the transparent film, and wherein the adhesive layer is disposed in at least an area different than another area in which the plurality of light blocking patterns is disposed, and an edge of each of the plurality of light blocking patterns is separated away from the adhesive layer.

BRIEF DESCRIPTION OF THE DRAWINGS

FIGS. 5A and 5B are diagrams illustrating an example of a structure by positions of a light modifying pattern which is included in the backlight unit illustrated in FIG. 4.

FIG. 10 is a diagram illustrating an example of a structure of light output patterns which are included in the backlight unit illustrated in FIG. 6.

DETAILED DESCRIPTION

Figure 1:
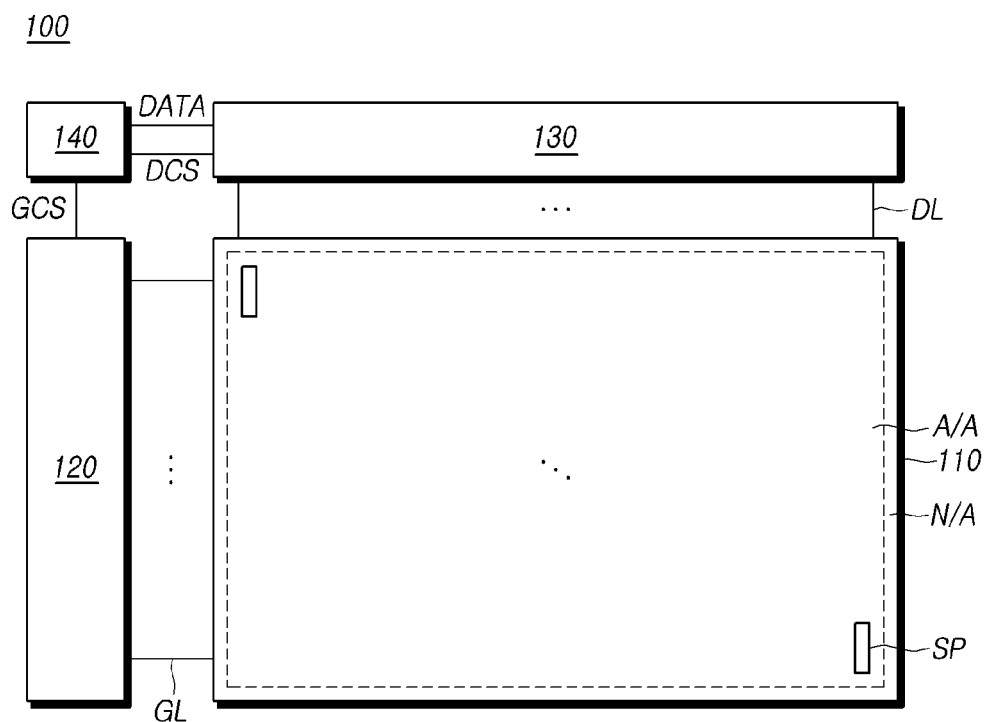
FIG. 1 is a diagram schematically illustrating a configuration of a display device according to embodiments of the present invention.

Hereinafter, some embodiments of the present invention will be described in detail with reference to the accompanying drawings. In describing the invention with reference to the accompanying drawings, the same elements will be referred to by the same reference numerals or signs regardless of the drawing numbers. When it is determined that detailed description of known configurations or functions involved in the invention makes the gist of the invention obscure, the detailed description thereof will not be made.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "linked," "coupled," or "connected" to another element, it should be understood that the element can be directly coupled or connected to another element or still another element may be "interposed" therebetween or the elements may be "linked," "coupled," or "connected" to each other with still another element interposed therebetween.

FIG. 1 is a diagram schematically illustrating a configuration of a display device 100 according to embodiments of the present invention.

Referring to FIG. 1, the display device 100 according to the embodiments of the invention includes a display panel 110 including an active area A/A and a non-active area N/A, and a gate drive circuit 120, a data drive circuit 130, and a controller 140 for driving the display panel 110.

In the display panel 110, a plurality of gate lines GL and a plurality of data lines DL are arranged and sub-pixels SP are arranged in areas in which the gate lines GL and the data lines DL cross each other.

The gate drive circuit 120 is controlled by the controller 140 and controls drive timing of a plurality of sub-pixels SP by sequentially outputting a scan signal to the plurality of gate lines GL arranged in the display panel 110.

The gate drive circuit 120 includes one or more gate driver integrated circuits GDIC and may be located on only one side or on both sides of the display panel 110 depending on a drive mode.

Each gate driver integrated circuit GDIC may be connected to a bonding pad of the display panel 110 in a tape automated bonding (TAB) system or a chip on glass (COG) system or may be realized in a gate in panel (GIP) system and disposed directly in the display panel 110. In some cases, each gate driver integrated circuit GDIC may be integrated and disposed in the display panel 110. Each gate driver integrated circuit GDIC may be realized in a chip on film (COF) system in which it is mounted on a film connected to the display panel 110.

The data drive circuit 130 receives image data from the controller 140 and converts the image data into a data voltage of an analog type. Then, the data drive circuit 130 outputs the data voltage to the data lines DL at the timing at which a scan signal is applied to the gate lines GL such that the sub-pixels SP express brightness corresponding to the image data.

The data drive circuit 130 can include one or more source driver integrated circuits SDIC.

Each source driver integrated circuit SDIC can include a shift register, a latch circuit, a digital-analog converter, and an output buffer.

Each source driver integrated circuit SDIC may be connected to a bonding pad of the display panel 110 in a tape automated bonding (TAB) system or a chip on glass (COG) system or may be disposed directly in the display panel 110. In some cases, the source driver integrated circuits SDIC may be integrated and disposed in the display panel 110. Each gate driver integrated circuit GDIC may be realized in a chip on film (COF) system. In this case, each source driver integrated circuit SDIC may be mounted on a film connected to the display panel 110 and be electrically connected to the display panel 110 via wires on the film.

The controller 140 supplies various control signals to the gate drive circuit 120 and the data drive circuit 130, and controls operations of the gate drive circuit 120 and the data drive circuit 130.

The controller 140 may be mounted on a printed circuit board, a flexible printed circuit, or the like and be electrically connected to the gate drive circuit 120 and the data drive circuit 130 via the printed circuit board, the flexible printed circuit, or the like.

The controller 140 causes the gate drive circuit 120 to output a scan signal in accordance with a timing which is realized in each frame, converts image data received from the outside into a data signal format which is used in the data drive circuit 130, and outputs the converted image data to the data drive circuit 130.

The controller 140 receives various timing signals including a vertical synchronization signal VSYNC, a horizontal synchronization signal HSYNC, an input data enable signal DE, and a clock signal CLK in addition to image data from the outside (for example, a host system).

The controller 140 can generate various control signals using various timing signals received from the outside and output the generated control signals to the gate drive circuit 120 and the data drive circuit 130.

For example, the controller 140 may output various gate control signals GCS including a gate start pulse GSP, a gate shift clock GSC, and a gate output enable signal GOE to control the gate drive circuit 120.

Here, the gate start pulse GSP controls an operation start timing of one or more gate driver integrated circuits GDIC of the gate drive circuit 120. The gate shift clock GSC is a clock signal which is input commonly to the one or more gate driver integrated circuits GDIC and controls a shift timing of a scan signal. The gate output enable signal GOE designates timing information of the one or more gate driver integrated circuits GDIC.

The controller 140 outputs various data control signals DCS including a source start pulse SSP, a source sampling clock SSC, and a source output enable signal SOE to control the data drive circuit 130.

Here, the source start pulse SSP controls a data sampling start timing of one or more source driver integrated circuits SDIC of the data drive circuit 130. The source sampling clock SSC is a clock signal for controlling sampling timings of data in the one or more source driver integrated circuits SDIC. The source output enable signal SOE controls an output timing of the data drive circuit 130.

The display device 100 may further include a power supply management integrated circuit that supplies various voltages or currents to the display panel 110, the gate drive circuit 120, the data drive circuit 130, and the like or controls various voltage or currents to be supplied.

Each sub pixel SP is defined by intersection of one gate line GL and one data line DL and liquid crystal or a light emitting element may be disposed therein depending on the type of the display device 100.

For example, when the display device 100 is a liquid crystal display device, the display device 100 includes a light source device such as a backlight unit that emits light to the display panel 110, and liquid crystal is disposed in the sub-pixels SP of the display panel 110. By adjusting alignment of the liquid crystal using an electric field which is formed with application of a data voltage to the sub pixels SP, it is possible to express brightness corresponding to image data and to display an image.

Figure 2:
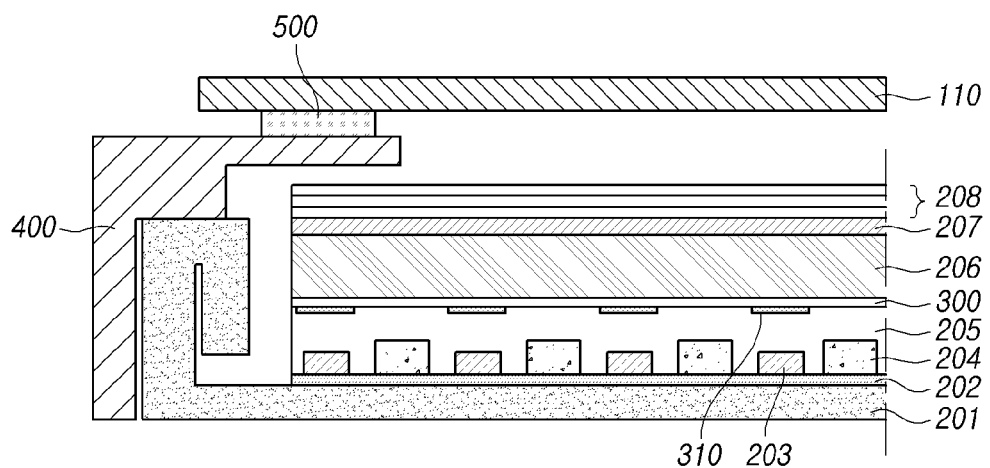
FIG. 2 is a diagram illustrating an example of a structure of a backlight unit which is included in the display device according to the embodiments of the invention.

FIG. 2 is a diagram illustrating an example of a structure of a backlight unit which is included in the display device 100 according to the embodiments of the invention.

Referring to FIG. 2, the display device 100 according to the embodiments of the invention includes a display panel 110 and a backlight unit that is disposed below the display panel 110 and supplies light to the display panel 110.

Various structures may be disposed between the backlight unit and the display panel 110. For example, the display panel 110 can be fixed to the backlight unit using a guide panel 400, a foam pad 500, and the like, but the invention is not limited thereto.

The backlight unit can include a cover bottom 201 that accommodates optical elements constituting the backlight unit and the like.

A printed circuit 202 can be disposed on the cover bottom 201 and a plurality of light sources 203 can be disposed on the printed circuit 202.

The printed circuit 202 may have a board shape and a reflection film 204 may be disposed in at least some areas of areas in which the light sources 203 are not disposed on the printed circuit 202. The reflection film 204 may be a reflection plate.

A light source protecting portion 205 can be disposed on the plurality of light sources 203 and the reflection film 204. The light source protecting portion 205 can protect a plurality of light sources 203 and provide a function of diffusing light emitted from the light sources 203. In some embodiments, the light source protecting portion 205 can contact the light source 203 directly, and protect the light source 203 and provide a function of guiding a light.

A transparent film 300 is disposed on the light source protecting portion 205, and a plurality of optical patterns 310 can be disposed on at least a portion of a surface of the bottom surface of the transparent film 300 and/or the top surface of the transparent film 300.

Here, the plurality of optical patterns 310 can be light controlling patterns. And the plurality of optical patterns 310 can be disposed at positions corresponding to the plurality of light sources 203 on the bottom surface of the transparent film 300. Alternatively, the plurality of optical patterns 310 can be disposed at positions corresponding to the plurality of light sources 203 on the top surface of the transparent film 300. For example, each of the plurality of the optical patterns 310 can be disposed to correspond to holes formed in the reflection film 204. In some cases, an area of the optical patterns 310 can be the same as an area of a hole formed in the reflection film 204. The optical patterns 310 can enhance image quality of the backlight unit by scattering, reflecting, or diffracting portions of light that is emitted vertically from the light sources 203.

And the optical patterns 310 can transmit portions of light emitting from the light sources 203. And the optical patterns 310 can be light controlling patterns that can transmit portions of light.

That is, by disposing the optical patterns 310 in an area in which intensity of light emitted from the light sources 203 is the highest, it is possible to reduce luminance deviation or the like between an area in which the light sources 203 are disposed (an area in which light intensity is high) and an area between the light sources 203 (an area in which light intensity is low).

A diffusion film 206 that diffuses light incident from below can be disposed on the transparent film 300. The diffusion film 206 may be a diffusion plate.

A color conversion sheet 207 or one or more optical sheets 208 can be disposed on the diffusion film 206.

FIGS. 3A to 3E are diagrams illustrating examples of a specific structure of the backlight unit illustrated in FIG. 2.

Figure 3A:
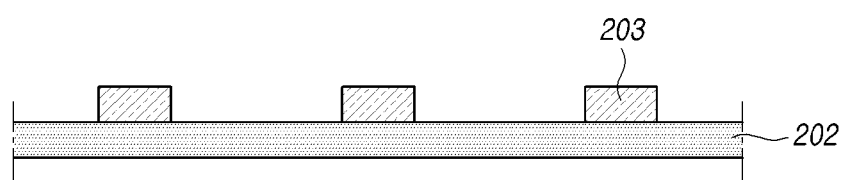
FIGS. 3A, 3B, 3C, 3D, and 3E are diagrams illustrating examples of the backlight unit illustrated in FIG. 2.

Referring to FIG. 3A, a plurality of light sources 203 are disposed on the printed circuit 202.

Each light source 203 may be, for example, a light emitting diode (LED), a mini light emitting diode (mind LED), or a micro light emitting diode (µLED). Accordingly, the light sources 203 can be mounted and arranged in a form of chips on the printed circuit 202, thereby reducing the thickness of the backlight unit. In some embodiments, the light sources 203 can be a flip chip type.

Each light source 203 may emit light of a white wavelength band or may emit light of a specific wavelength band (for example, a blue wavelength band).

Figure 3B:
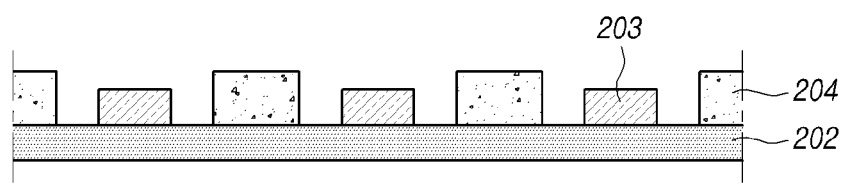

Referring to FIG. 3B, a reflection film 204 can be disposed in at least some areas of areas other than the areas in which the light sources 203 are disposed on the printed circuit 202.

This reflection film 204 is formed such that areas corresponding to the light sources 203 are open, and can be set and disposed on the printed circuit 202. The reflection film 204 reflects light emitted from the light sources 203 toward the front surface of the backlight unit to enhance light efficiency of the backlight unit.

When the light sources 203 are disposed in the form of chips, the size of each light source 203 is small and thus the height of the reflection film 204 may be greater than the height of the light sources 203.

Therefore, light emitted laterally from the light sources 203 can be reflected by the side surface of the reflection film 204 and be emitted to the front surface of the backlight unit, whereby light efficiency of the backlight unit can be further enhanced.

In some cases, a coated reflection film may be disposed on the printed circuit 202.

That is, the front surface (facing the display panel 110) of the printed circuit 202 or an area other than the areas in which the light sources 203 are disposed may be coated with a reflection film to enhance light efficiency.

In this case, the reflection film with which the printed circuit 202 is coated may serve as the reflection film 204 or may be disposed along with the reflection film 204 to provide a reflection function.

Figure 3C:
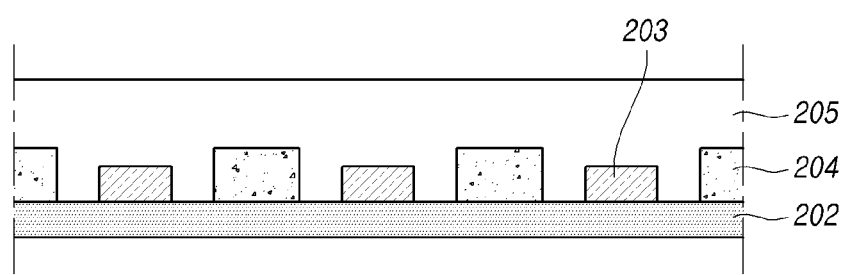

Referring to FIG. 3C, a light source protecting portion 205 may be disposed on a plurality of light sources 203 and a reflection film 204.

The light source protecting portion 205 may include, for example, a resin.

When the light source protecting portion 205 is includes a resin, the light source protecting portion 205 can be formed by disposing partition walls outside the printed circuit 202 or in a peripheral area of the area in which the plurality of light sources 203 are disposed and applying a resin in the partition walls.

The light source protecting portion 205 performs a function of protecting the plurality of light sources 203 disposed on the printed circuit 202 and may serve to diffuse light emitted from the light sources 203 and provide a function of a light guide.

That is, the light source protecting portion 205 enables light emitted from the light sources 203 to diffuse more uniformly to the top surface of the light source protecting portion 205.

In the embodiments of the invention, by disposing optical patterns 310 having optical characteristics at positions corresponding to the light sources 203 on the light source protecting portion 205, it is possible to decrease the thickness of the backlight unit and to further improve uniformity of an image.

Figure 3D:
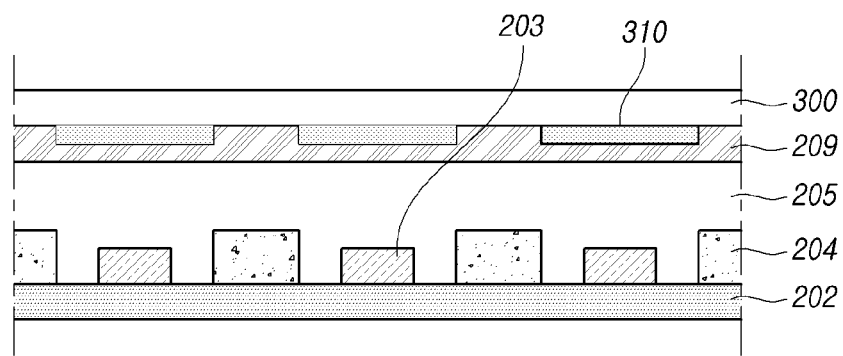

Referring to FIG. 3D, a transparent film 300 may be disposed on the light source protecting portion 205 and a plurality of optical patterns 310 may be disposed on the bottom surface of the transparent film 300. In some embodiments, the plurality of optical patterns 310 may be disposed on the top surface of the transparent film 300. The transparent film 300 can be bonded onto the light source protecting portion 205 with an adhesive layer 209 interposed therebetween. The adhesive layer 209 may be an optical clear adhesive OCA. The transparent film 300 may include, for example, PET, but embodiments of the invention is not limited thereto.

A plurality of optical patterns 310 disposed on the bottom surface of the transparent film 300 may correspond to a plurality of light sources 203 disposed on the printed circuit 202.

That is, at least a part of each optical pattern 310 may be disposed to overlap the corresponding light source 203, and each optical pattern 310 may be disposed to overlap an area including the area in which the corresponding light source 203 is disposed in consideration of diffusion characteristics of light.

These optical patterns 310 have a certain reflectivity. And optical patterns 310 can scatter, reflect, diffract, or transmit portions of light emitted from the light sources 203.

For example, each optical pattern 310 can scatter light emitted vertically (or approximately vertically) from the corresponding light source 203 and output the light in the vertical direction and the oblique directions. Alternatively, the optical patterns 310 may enable light to be output to the areas between the light sources 203 by reflecting the light emitted vertically from the light sources 203 and allowing the reflection film 204 to reflect the light again.

In this way, by adjusting an emission direction of the light which is emitted vertically from the light sources 203 using the optical patterns 310, it is possible to improve image quality of the backlight unit. That is, luminance uniformity of the backlight unit can be improved since light emitted from the light sources 203 is scattered, reflected, diffracted, or transmitted by the optical patterns 310.

Figure 3E:
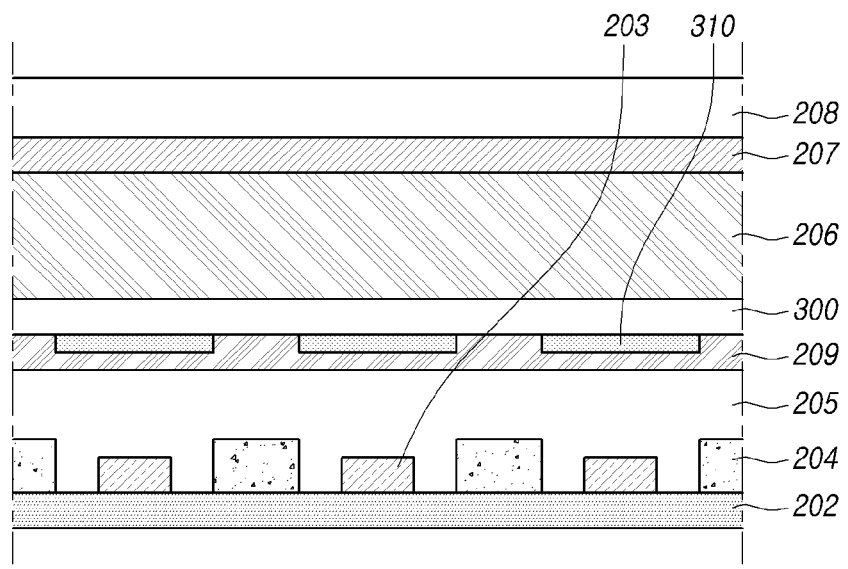

Referring to FIG. 3E, a diffusion film 206 can be disposed on the transparent film 300 and a color conversion sheet 207 can be disposed on the diffusion film 206. One or more optical sheets 208 can be disposed on the color conversion sheet 207.

Here, the positions at which the diffusion film 206 and the color conversion sheet 207 are disposed may be exchanged.

The diffusion film 206 diffuses light which is emitted via the transparent film 300.

The color conversion sheet 207 can emit light of a specific wavelength band in response to light incident thereon.

For example, when the light sources 203 emit light of a first wavelength band (for example, blue light), the color conversion sheet 207 can emit light of a second wavelength band (for example, green light) and light of a third wavelength band (for example, red light) in response to light incident thereon.

The color conversion sheet 207 may be disposed on only some area on the diffusion film 206 in some cases.

For example, when the light sources 203 emit light of a blue wavelength band, the color conversion sheet 207 may be disposed in only areas other than areas of the display panel 110 corresponding to areas in which blue sub-pixels SP are disposed. That is, light not passing through the color conversion sheet 207 can be made to reach blue sub-pixels SP of the display panel 110.

The color conversion sheet 207 may not be necessarily provided depending on the light sources 203.

For example, when the light sources 203 emit light of a white wavelength band or an emission surface of the light source 203 emitting light of a blue wavelength band is coated with a color conversion film emitting light of a green wavelength band and light of a red wavelength band, the color conversion sheet 207 may not be provided.

In this way, in the embodiments of the invention, by allowing the backlight unit to include the transparent film 300 including the optical patterns 310 which are disposed at the positions corresponding to the light sources 203 and various optical elements, it is possible to decrease the thickness of the backlight unit and to improve image quality of the backlight unit.

Specific examples of the optical patterns 310 disposed on the transparent film 300 and the embodiments of the invention will be described below.

Figure 4:
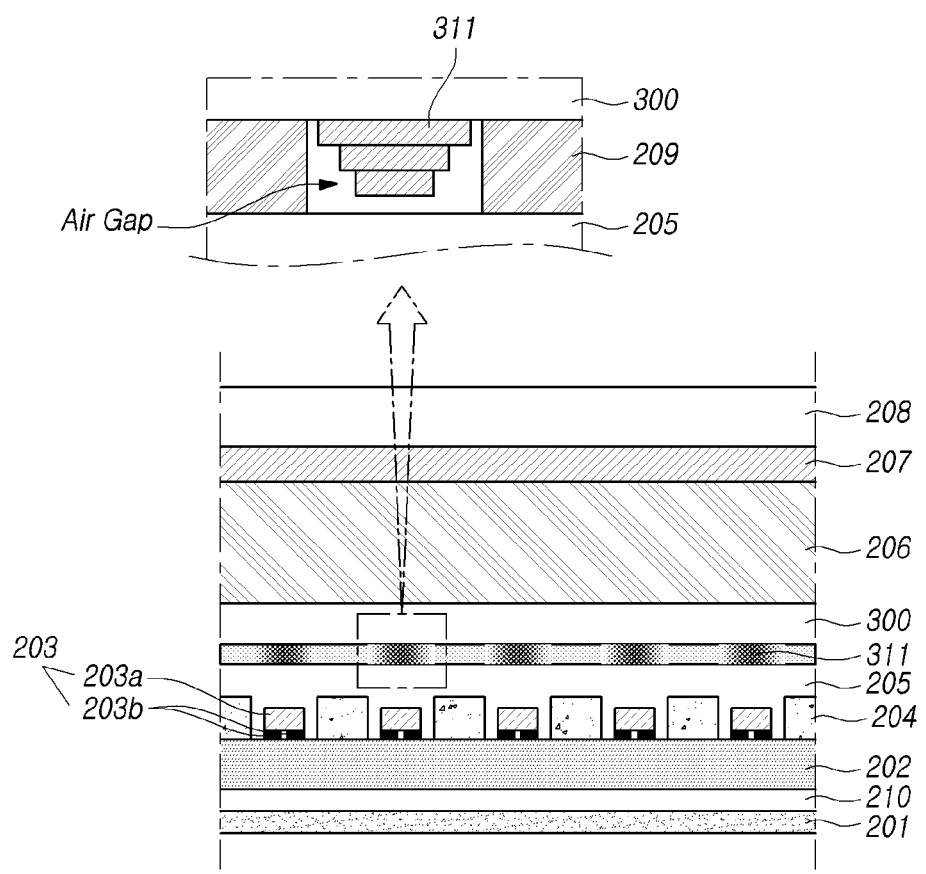
FIG. 4 is a diagram illustrating an embodiment of a structure of the backlight unit according to the embodiments of the invention.

FIG. 4 is a diagram illustrating an embodiment of a structure of the backlight unit according to the embodiments of the invention.

Referring to FIG. 4, a printed circuit 202 is disposed on a cover bottom 201. The printed circuit 202 can be bonded by an adhesive tape 210 which is disposed between the cover bottom 201 and the printed circuit 202.

A plurality of light sources 203 are disposed on the printed circuit 202, and a reflection film 204 is disposed on at least some areas of areas other than the areas in which the light sources 203 are disposed.

Here, each light source 203 may be, for example, a light emitting diode (LED) and include a light emitting portion 203a including an n-type semiconductor layer, an active layer, and a p-type semiconductor layer and an electrode portion 203b.

A light source protecting portion 205 is disposed on the plurality of light sources 203 and the reflection film 204.

A transparent film 300 in which optical patterns 310 are disposed at positions corresponding to the light sources 203 is disposed on the light source protecting portion 205. Here, the optical patterns 310 disposed on the bottom surface of the transparent film 300 may be light modifying patterns 311.

A diffusion film 206, a color conversion sheet 207, an optical sheet 208, and the like can be disposed on the transparent film 300.

The light modifying patterns 311 disposed on the bottom surface of the transparent film 300 can be realized by printing a material having light blocking characteristics on the transparent film 300 and the light modifying patterns 311 may be disposed, for example, using a method of printing a $TiO_2$ ink on the transparent film 300. In embodiments where the light modifying patterns 311 use $TiO_2$, if the light modifying patterns 311 are disposed in one layer, reflectivity of the light modifying patterns 311 may be 60~70%. And absorptivity and/or transmissivity of the light modifying patterns 311 may be 30~40%.

The light modifying patterns 311 disposed on the bottom surface of the transparent film 300 may be disposed in one layer or be disposed in a multi-layer structure. For example, the light modifying patterns 311 may be disposed in two layers. And if the light modifying patterns 311 are disposed in two layers, reflectivity of the light modifying patterns 311 may be 70~80%. And absorptivity and/or transmissivity of the light modifying pattern 311 may be 20~30$. But reflectivity of the light modifying patterns 311 is not limited to above examples. For instance, if content of $TiO_2$ included in the light modifying patterns 311 increases or thickness of a layer of the light modifying patterns 311 becomes greater, reflectivity of the light modifying patterns 311 may increase and transmissivity of the light modifying patterns 311 may decrease.

That is, as illustrated in FIG. 4, each light modifying pattern 311 disposed on the bottom surface of the transparent film 300 can include three layers.

Such light modifying patterns 311 can be realized using a method of printing a light modifying material on the transparent film 300, for example, three times, and the area of the light modifying material which is printed can be gradually reduced. By turning the transparent film 300 in which the light modifying patterns 311 are disposed upside down and disposing the upside-down transparent film 300 on the light source protecting portion 205, the light modifying patterns 311 can be disposed on the light sources 203.

Accordingly, the area of each light modifying pattern 311 can decrease downward in the transparent film 300, and the thickness of a central part of the light modifying pattern 311 may be larger than the thickness of a peripheral part thereof.

That is, since intensity of light which is emitted vertically from each light source 203 is the highest, the central part of each light modifying pattern 311 can have a larger thickness.

In this way, by disposing the light modifying patterns 311 on the light sources 203, it is possible to modify or block light which is emitted vertically from each light source 203 and to prevent or mitigate a hot spot phenomenon from occurring in the areas in which the light sources 203 are disposed.

The transparent film 300 on which the light modifying patterns 311 are disposed can be bonded onto the light source protecting portion 205 using an adhesive layer 209.

Here, the adhesive layer 209 may be disposed in at least some areas of areas other from the areas in which light modifying patterns 311 are disposed on the bottom surface of the transparent film 300.

Accordingly, the adhesive layer 209 is not disposed in the areas in which the light modifying patterns 311 are disposed, and an air gap may be present between the light modifying patterns 311 and the light source protecting portion 205.

A side portion of each light modifying pattern 311 and the adhesive layer 209 may be separated from each other.

Since an air gap is present between the light modifying patterns 311 and the light source protecting portion 205, light which is emitted laterally from each light modifying pattern 311 can be reflected by the air gap.

That is, light which is emitted laterally from each light modifying pattern 311 can be emitted at a great refraction angle by an air layer having a low refractive index or can be reflected by the air layer. The light reflected by the air layer is reflected again by the reflection film 204 and is then emitted, it is possible to enhance light efficiency while assisting a light modifying or blocking function of the light modifying patterns 311.

In this way, by using a structure in which a light modifying pattern 311 and an air gap are disposed at the position corresponding to each light source 203, it is possible to prevent a hot spot phenomenon and to enhance light efficiency of the backlight unit.

At this time, the light modifying patterns 311 disposed on the bottom surface of the transparent film 300 may be disposed with different structures depending on positions at which they are disposed.

Figure 5B:
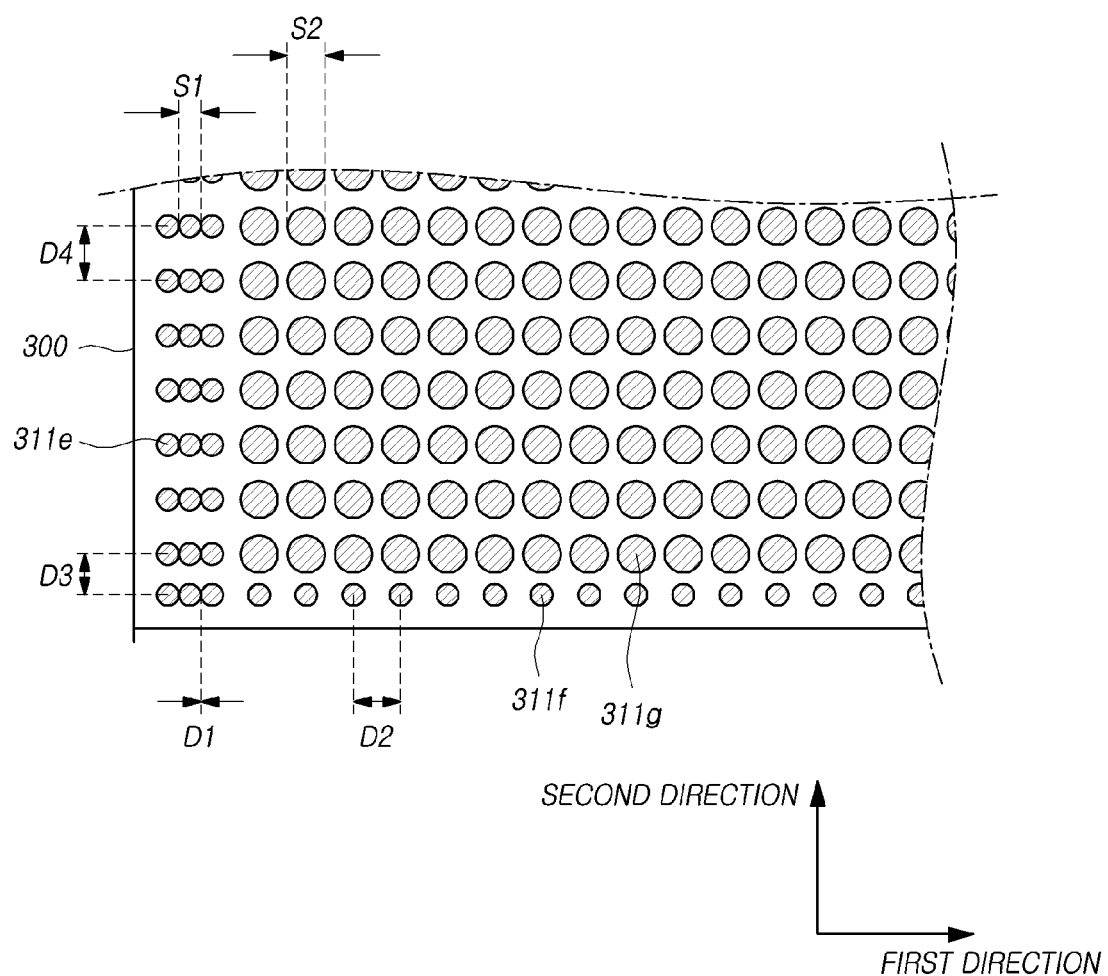

FIGS. 5A and 5B are diagrams illustrating an example of a structure by positions of the light modifying patterns which are included in the backlight unit illustrated in FIG. 4.

FIG. 5A illustrates an example of luminance which is exhibited by the backlight unit depending on the structure of the light modifying patterns 311, where <EX1> illustrates an example of luminance which is measured when the light modifying patterns 311 are disposed in a constant structure and <EX2> illustrates an example of luminance which is measured when the light modifying patterns 311 are disposed in different structures by positions.

As illustrated in <EX1> of FIG. 5A, when the light modifying patterns 311a disposed in a peripheral area of the backlight unit and the light modifying patterns 311d disposed in a central area (surrounded by the peripheral area) thereof have the same structure, luminance of the peripheral area of the backlight unit may be lower.

That is, since the number of light sources 203 that supply light to the peripheral area of the backlight unit is relatively small in comparison to the number of light sources 203 that supply light to the central area, the luminance may be lower than that in the central area of the backlight unit when the light modifying patterns 311 having the same light modifying or blocking characteristics are disposed in both areas.

Accordingly, as illustrated in <EX2> of FIG. 5A, by disposing the light modifying patterns 311a and the light modifying patterns 311d with different structures in the peripheral area and the central area of the backlight unit, it is possible to prevent or mitigate a decrease in luminance in the peripheral area of the backlight unit and to make the luminance more uniform as a whole.

For example, the light modifying patterns 311 may be disposed such that the thickness T1 of the light modifying patterns 311a disposed in the peripheral area of the backlight unit is less than the thickness T2 of the light modifying patterns 311d disposed in the central area thereof.

Alternatively, the light modifying patterns 311 may be disposed such that the area W1 of the thickest part of the light modifying patterns 311b disposed adjacent to the peripheral area of the backlight unit is less than the area W2 of the thickest part of the light modifying patterns 311d. That is, the area of the part having high light modifying or blocking characteristics in the light modifying patterns 311a or 311b disposed in the peripheral area of the backlight unit or the area adjacent to the peripheral area can be set to be less.

The light modifying patterns 311 may be disposed such that the thickness of the light modifying patterns 311 decreases gradually or the area of the thickest part of the light modifying patterns 311 decreases gradually from the central area to the peripheral area of the backlight unit.

In some cases, the light modifying patterns 311 may be disposed differently such that the numbers of light sources 203 or the gaps between the light sources 203 in the central area and the peripheral area of the backlight unit are different.

Another example of the structure in which the light modifying patterns 311 are disposed on the bottom surface of the transparent film 300 will be described with reference to FIG. 5B.

Here, the gap between the light sources 203 disposed in the peripheral area of the backlight unit may be less than the gap between the light sources 203 disposed in the central area of the backlight unit. That is, the light sources 203 can be disposed more densely in the peripheral area of the backlight unit such that the luminance is more uniform or constant in the central area and the peripheral area of the backlight unit.

Since the light modifying patterns 311 disposed on the bottom surface of the transparent film 300 are disposed to correspond to the light sources 203, the gap between the light modifying patterns 311 disposed in the peripheral area of the backlight unit may be different from the gap between the light modifying patterns 311 disposed in the central area.

For example, the gap D1 in a first direction between the light modifying patterns 311 disposed in the peripheral area between the backlight unit may be less than the gap D2 in the first direction between the light modifying patterns 311 disposed in the central area. The gap D3 in a second direction between the light modifying patterns 311 disposed in the peripheral area of the backlight unit may be less than the gap D4 in the second direction between the light modifying patterns 311 disposed in the central area.

Here, the size, the thickness, and the like of the light modifying patterns 311 disposed in the peripheral area of the backlight unit may be different from the size, the thickness, and the like of the light modifying patterns 311 disposed in the central area of the backlight unit.

For example, as illustrated in FIG. 5B, the sizes S1 of the light modifying patterns 311e and 311f disposed in the peripheral area of the backlight unit may be less than the size S2 of the light modifying patterns 311g disposed in the central area of the backlight unit.

Alternatively, the light modifying patterns 311 may have a multi-layer structure as described above. In this case, the thickness of the light modifying patterns 311e and 311f disposed in the peripheral area of the backlight unit or the area of the thickest part thereof may be less than the thickness of the light modifying patterns 311g disposed in the central area of the backlight unit or the area of the thickest part thereof.

That is, by decreasing the size of the light modifying patterns 311e and 311f disposed in the peripheral area of the backlight unit, the light modifying patterns can be disposed to correspond to the light sources 203 which are disposed with a small gap. Accordingly, it is possible to prevent or mitigate a hot spot from occurring at the positions corresponding to the light sources 203 in the peripheral area of the backlight unit.

By lowering a level with which light emitted from the light sources 203 is modified or blocked in the peripheral area of the backlight unit, it is possible to increase light intensity which is emitted, to prevent or mitigate a decrease in luminance in the peripheral area of the backlight unit, and to make the entire area of the backlight unit exhibit more uniform luminance.

In this way, by disposing the light modifying patterns 311 in different structures depending on areas of the backlight unit, it is possible to prevent or mitigate a decrease in luminance in the peripheral area of the backlight unit and to improve luminance uniformity.

It is possible to prevent or mitigate a hot spot in the backlight unit and to improve luminance uniformity by adjusting the structures in which the light modifying patterns 311 are disposed.

In the embodiments of the invention, it is possible to provide a measure capable of improving image quality of the backlight unit and enhancing light efficiency by diffracting light which is emitted vertically from the light sources 203.

Figure 6:
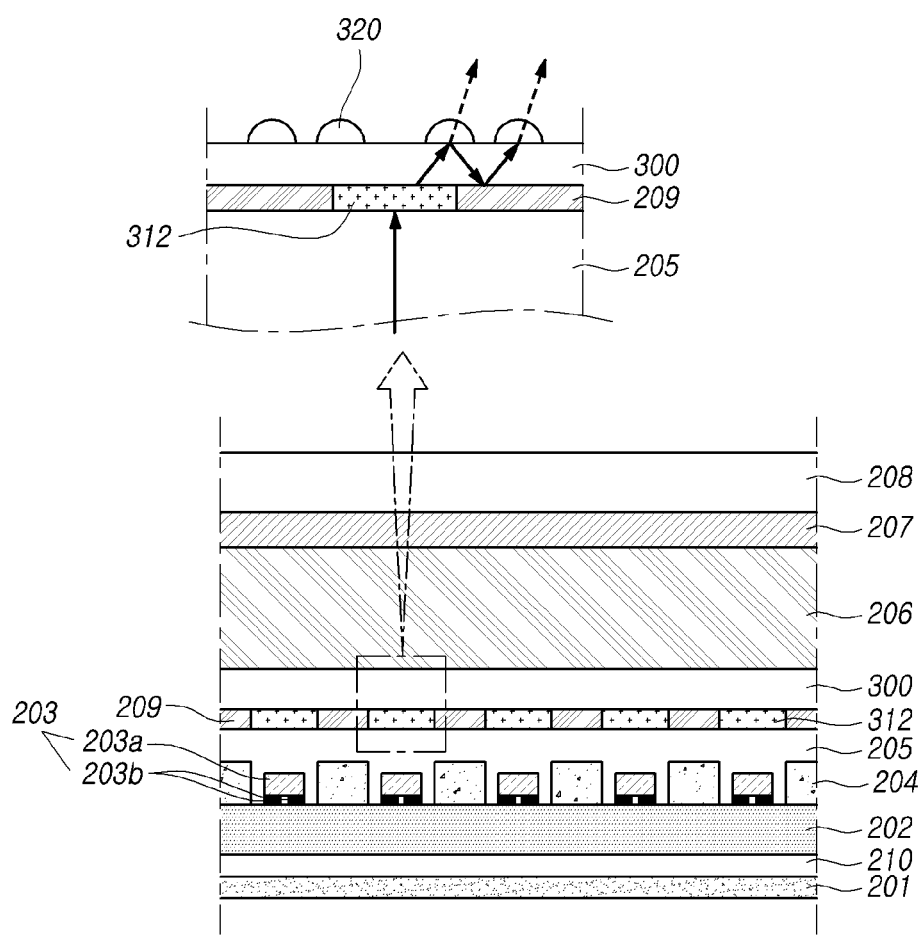
FIG. 6 is a diagram illustrating an embodiment of the structure of the backlight unit according to the embodiments of the invention.

FIG. 6 is a diagram illustrating an embodiment of the structure of the backlight unit according to the embodiments of the invention.

Referring to FIG. 6, a printed circuit 202 bonded to a cover bottom 201 by an adhesive tape 210 is disposed thereon and a plurality of light sources 203 are disposed on the printed circuit 202. A reflection film 204 is disposed in at least some areas of areas other than areas in which the light sources 203 are disposed on the printed circuit 202.

A light source protecting portion 205 is disposed on the plurality of light sources 203 and the reflection film 204 and a transparent film 300 in which optical patterns 310 are disposed at positions corresponding to the light sources 203 is disposed on the light source protecting portion 205.

The transparent film 300 and the light source protecting portion 205 can be bonded by an adhesive layer 209. A diffusion film 206, a color conversion sheet 207, an optical sheet 208, and the like can be disposed on the transparent film 300.

Here, the optical patterns 310 disposed on the bottom surface of the transparent film 300 may be diffraction patterns 312. The diffraction patterns 312 may have a refractive index higher than the refractive index of the transparent film 300.

Accordingly, light which is emitted vertically from each light source 203 can be diffracted by the corresponding diffraction pattern 312 and be incident on the transparent film 300 with a large refraction angle (e.g., non-vertical refraction angle).

That is, since light passing through the diffraction pattern 312 is incident on the transparent film 300 with a refraction angle at which light can experience total internal reflection, light incident on the transparent film 300 can experience total internal reflection and propagate in the transparent film 300.

A plurality of light output patterns 320 having a refractive index higher than the refractive index of the transparent film 300 can be disposed on the transparent film 300.

Accordingly, when light experiences total internal reflection in the transparent film 300 reaches the bottom surface of each light output pattern 320, the refraction angle is less than the incidence angle and thus light can be emitted to the outside via the light output pattern 320.

In this way, since light emitted vertically from each light source 203 is incident on the transparent film 300 in a state in which an optical path thereof is adjusted by the diffraction patterns 312, light loss is reduced or mitigated.

Since light that is totally reflected in the transparent film 300 is emitted from the positions at which the light output patterns 320 are disposed, the area or direction in which light is emitted on the transparent film 300 can be adjusted on the basis of the positions at which the light output patterns 320 are disposed.

Accordingly, it is possible to reduce or minimize loss of light emitted from the light sources 203, to improve image quality of the backlight unit and to enhance light efficiency by controlling the positions from which light is emitted, and to reduce power consumption of the backlight unit.

Figure 7:
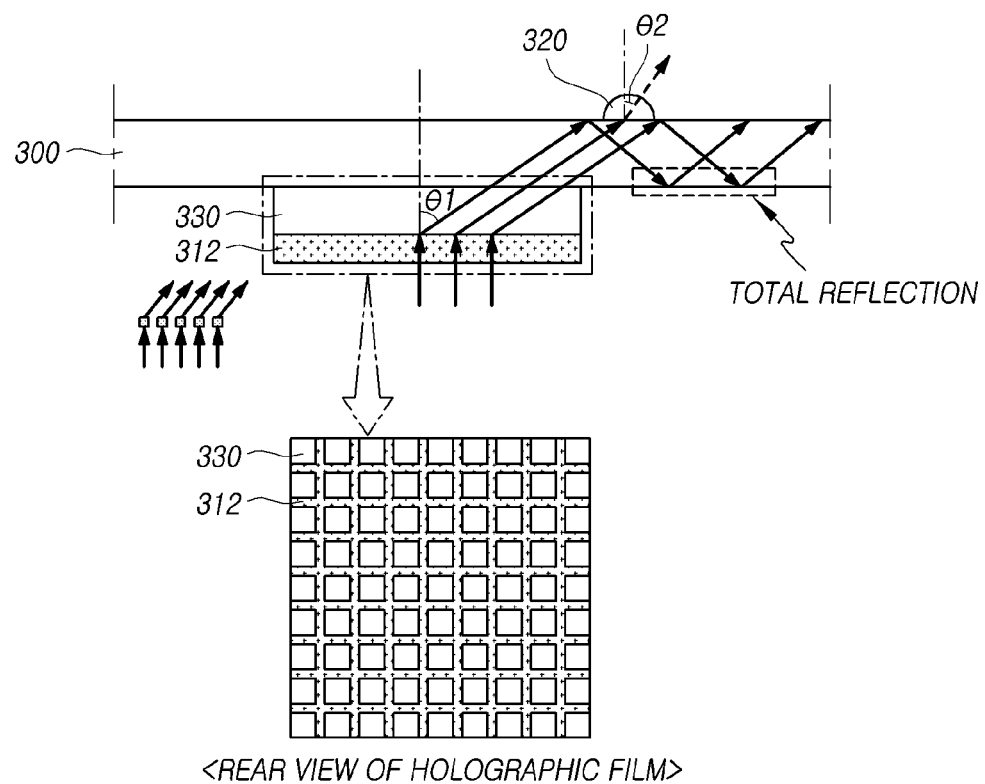
FIG. 7 is a diagram illustrating an example of a structure of a transparent film in which diffraction patterns and light output patterns are arranged and which is included in the backlight unit illustrated in FIG. 6.

FIG. 7 is a diagram illustrating an example of a structure of the transparent film 300 in which diffraction patterns 312 and light output patterns 320 are arranged and which is included in the backlight unit illustrated in FIG. 6.

Referring to FIG. 7, a plurality of diffraction patterns 312 are disposed at positions corresponding to the light sources 203 on the bottom surface of the transparent film 300. A plurality of light output patterns 320 are disposed on the top surface of the transparent film 300.

Here, a base film 330 is disposed between the transparent film 300 and the diffraction patterns 312. The base film 330 and the diffraction patterns 312 can be collectively referred to as a holographic film.

That is, the diffraction patterns 312 may be disposed on the bottom surface of the transparent film 300, and the base film 330 may be disposed between the transparent film 300 and the diffraction patterns 312 in order to facilitate arrangement of the diffraction patterns 312 or to enhance a total internal reflection effect of light in the transparent film 300.

The refractive index of the base film 330 may be lower than the refractive index of the diffraction patterns 312. Accordingly, light which is incident on the base film 330 via the diffraction patterns 312 can be incident at a total internal reflection angle.

The refractive index of the base film 330 may be equal or almost close to the refractive index of the transparent film 300. Here, when the refractive index of the base film 330 is different from the refractive index of the transparent film 300, it is possible to prevent light from not being emitted from the light output patterns 320 due to excessive total internal reflection of light incident on the transparent film 300 by setting the refractive index of the transparent film 300 to be at least slightly greater than the refractive index of the base film 330.

The diffraction patterns 312 can be disposed in a form in which a specific structure is repeated on the bottom surface of the base film 330 and may be disposed, for example, in a lattice form. The diffraction patterns 312 may be disposed in various forms capable of diffracting light.

That is, the form of the diffraction patterns 312 is not limited to a specific form, and light which is emitted from the light sources 203 and passes through the diffraction patterns 312 experiences total internal reflection in the transparent film 300 due to the diffraction patterns 312 and the difference between the base film 330 and the transparent film 300.

Light reaching the light output patterns 320 that are disposed on the transparent film 300 and have a refractive index higher than the refractive index of the transparent film 300 is emitted to the outside via the light output patterns 320.

For example, when light incident on the transparent film 300 at an angle of $\theta 1$ reaches the light output patterns 320 having a refractive index higher than the refractive index of the transparent film 300, the light is incident at an angle of $\theta 2$ which is less than $\theta 1$ and thus can be emitted to the outside of the light output patterns 320.

In this way, by adjusting an emission path of light which is incident on the transparent film 300 using the light output patterns 320 without light loss, it is possible to enhance light efficiency and enhance luminance uniformity as a whole.

A layer for enhancing a total internal reflection effect may be additionally disposed on the transparent film 300.

Figure 8:
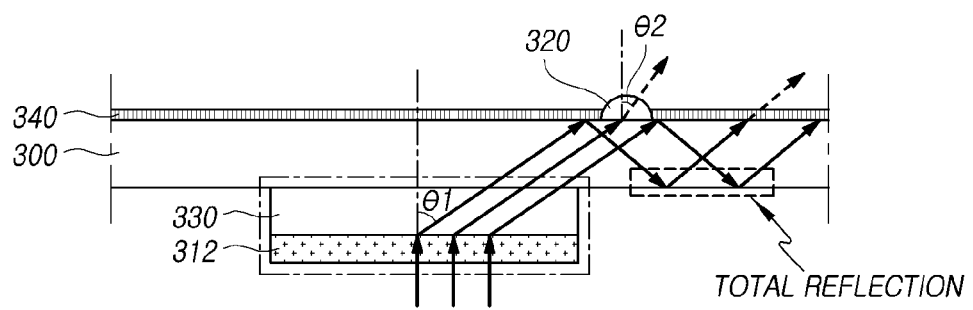
FIG. 8 is a diagram illustrating another example of the structure of the transparent film in which diffraction patterns and light output patterns are arranged and which is included in the backlight unit illustrated in FIG. 6.

FIG. 8 is a diagram illustrating another example of the structure of the transparent film 300 in which diffraction patterns 312 and light output patterns 320 are arranged and which is included in the backlight unit illustrated in FIG. 6.

Referring to FIG. 8, a holographic film including the base film 330 and the diffraction patterns 312 may be disposed at positions corresponding to the light sources 203 on the bottom surface of the transparent film 300.

The light output patterns 320 may be disposed on the transparent film 300.

Here, a coating layer 340 may be disposed in at least some areas of areas other than areas in which the light output patterns 320 are disposed on the transparent film 300. Some portions of light may be refracted by the coating layer 340 and other portions of light may be reflected by the coating layer 340. The refractive index of the coating layer 340 may be less than the refractive index of the transparent film 300.

That is, when light experiencing total internal reflection in the transparent film 300 reaches the coating layer 340 having a refractive index lower than the refractive index of the transparent film 300, the light cannot be emitted to the outside of the transparent film 300 and thus it is possible to enhance a total internal reflection effect of light in the transparent film 300.

When light experiencing total internal reflection in the transparent film 300 reaches the light output patterns 320, the light can be emitted to the outside via the light output patterns 320.

Accordingly, areas in which light is emitted on the transparent film 300 may be more accurately controlled by disposing the coating layer 340 and the light output patterns 320.

The coating layer 340 may be further disposed on the outer surfaces of the light output patterns 320.

Figure 9:
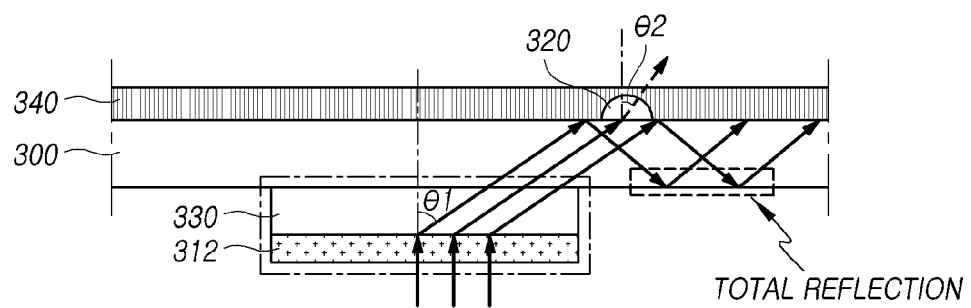
FIG. 9 is a diagram illustrating another example of the structure of the transparent film in which diffraction patterns and light output patterns are arranged and which is included in the backlight unit illustrated in FIG. 6.

FIG. 9 is a diagram illustrating another example of the structure of the transparent film 300 in which diffraction patterns 312 and light output patterns 320 are arranged and which is included in the backlight unit illustrated in FIG. 6.

Referring to FIG. 9, a holographic film may be disposed at positions corresponding to the light sources 203 on the bottom surface of the transparent film 300 and the light output patterns 320 may be disposed on the transparent film 300.

The coating layer 340 having a refractive index lower than the refractive index of the transparent film 300 may be disposed on the transparent film 300, and the coating layer 340 may also be disposed on the light output patterns 320.

That is, since light incident on the light output patterns 320 is incident at an increased incidence angle, the light can be emitted to the outside via the light output patterns 320 even when the coating layer 340 having a low refractive index is disposed on the light output patterns 320. Accordingly, the coating layer 340 can perform a function of enhancing a light guide function of the transparent film 300 in areas in which the light output patterns 320 are not disposed and protecting the light output patterns 320.

The coating layer 340 may be disposed in a constant height on the transparent film 300 and the light output patterns 320 such that an upper surface of the coating layer 340 (above the light output patterns 320) is flat or parallel to the transparent film 300.

Accordingly, the diffusion film 206 or the like may be easily disposed on the transparent film 300 in which the light output patterns 320 are disposed.

FIG. 10 is a diagram illustrating an example of the structure of the light output patterns 320 which are included in the backlight unit illustrated in FIG. 6.

Referring to FIG. 10, the light output patterns 320 which are disposed on the transparent film 300 may have various shapes in consideration of characteristics of light which is emitted.

For example, each light output pattern 320 may have a semispherical shape in which a horizontal radius and a vertical radius are the same. A general viewing angle can be realized using the light output pattern 320 having a semispherical shape in which a horizontal radius and a vertical radius are the same.

Alternatively, each light output pattern 320 may have an elliptical shape in which a semi-major axis is greater than a semi-minor axis. For example, the semi-minor axis may be 60% of the semi-major axis. Wide viewing angle characteristics can be realized using the light output patterns 320 having an elliptical shape in which a semi-major axis is larger than a semi-minor axis.

Alternatively, each light output pattern 320 may have a shape in which a top surface is flat and the top surface is narrower than a bottom surface. A section of such a light output pattern 320 may have a trapezoidal shape. That is, narrow viewing angle characteristics can be realized using the structure of the light output pattern 320 in which the top surface is flat (e.g., parallel to the bottom surface), and front luminance may be enhanced using such a structure.

Such a structure of the light output patterns 320 can be realized in various forms depending on characteristics of the display device 100. In some cases, light output patterns 320 having structures having different viewing angle characteristics may be mixed and disposed.

Positions, densities, and the like with which the light output patterns 320 are disposed can be determined depending on the positions of the light sources 203.

Figure 11:
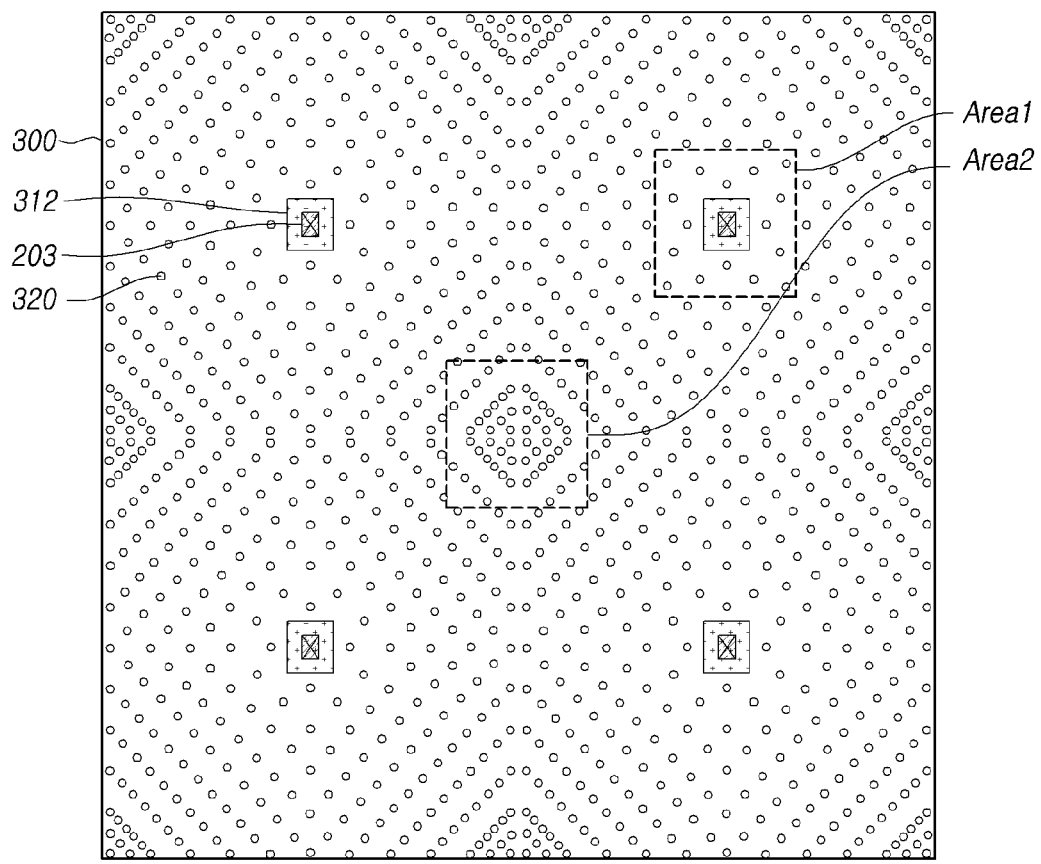
FIG. 11 is a diagram illustrating an example of an arrangement structure of light output patterns which are included in the backlight unit illustrated in FIG. 6.

FIG. 11 is a diagram illustrating an example of an arrangement structure of the light output patterns 320 which are included in the backlight unit illustrated in FIG. 6.

Referring to FIG. 11, the diffraction patterns 312 are disposed on the light sources 203 and the transparent film 300 is disposed on the diffraction patterns 312. The light output patterns 320 are disposed on the transparent film 300.

Here, the density with which the light output patterns 320 are disposed in an area adjacent to (e.g., overlapping) one light source 203 may be less than the density with which they are disposed in an area adjacent to a space between (e.g., not overlapping) the light sources 203.

That is, the number of light output patterns 320 disposed in a first area Area1 adjacent to one light source 203 may be less than the number of light output patterns 320 disposed in a second area Area2 that is adjacent to a space between the light sources 203 and which has the same area as the first area Area1.

For example, the density with which the light output patterns 320 are disposed in the central area of the backlight unit may be greater than the density with which the light output patterns 320 are disposed in the peripheral area of the backlight unit. Accordingly, it is possible to prevent or mitigate luminance of the peripheral area of the backlight unit having relatively small light intensity (in comparison to light intensity of the central area) from being reduced.

In this way, by adjusting the positions at which the light output patterns 320 are disposed on the transparent film 300 depending on the positions of the light sources, it is possible to effectively control an optical path of light emitted from the light sources 203 and to improve luminance uniformity and image quality of the backlight unit as a whole.

Figure 12:
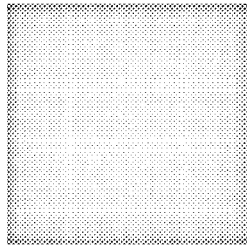
FIG. 12 is a diagram illustrating an example of a result of comparison in a simulation image and light efficiency between the backlight units according to the embodiments of the invention.
Figure 12:
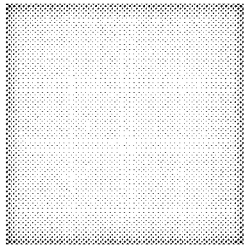

FIG. 12 is a diagram illustrating an example of a result of comparison in a simulation image and light efficiency between the backlight units according to the embodiments of the invention.

Referring to FIG. 12, CASE #1 represents a case in which the optical patterns 310 disposed at positions corresponding to the light sources 203 in the backlight unit are light modifying patterns 311, and CASE #2 represents a case in which the optical patterns 310 disposed in the backlight unit are diffraction patterns 312.

As illustrated in FIG. 12, by disposing the optical patterns 310 such as the light modifying patterns 311 or the diffraction patterns 312 at the positions corresponding to the light sources 203, it can be seen that a hot spot is prevented and luminance uniformity is improved.

When the diffraction patterns 312 are disposed, light loss due to the optical patterns 310 is decreased and thus it can be seen that light efficiency is further improved.

According to the embodiments of the invention, I tis possible to prevent a hot spot of the backlight unit and to improve luminance uniformity by disposing the optical patterns 310 that scatter, reflect, or diffract light on the light sources 203 of the backlight unit.

Accordingly, it is possible to decrease the thickness of the backlight unit and to provide high image quality.

By disposing the diffraction patterns 312 having a refractive index higher than the refractive index of the transparent film 300 on the bottom surface of the transparent film 300, light passing through the diffraction patterns 312 experiences total internal reflection in the transparent film 300 and thus loss of light which is emitted from the light sources 203 is prevented or mitigated.

By controlling an emission path of light using the light output patterns 320 that are disposed on the transparent film 300 and that have a refractive index higher than the refractive index of the transparent film 300, it is possible to improve image quality of the backlight unit and to enhance light efficiency to reduce power consumption.

The above description merely exemplifies the technical idea of the present invention, and various modifications and changes can be made by those skilled in the art without departing from the essential features of the invention. Accordingly, the embodiments disclosed in this specification are not for restricting the technical idea of the invention but for explaining the technical idea of the invention and thus the scope of the technical idea of the invention is not limited thereto. The scope of the invention is defined by the appended claims and all technical ideas within a range equivalent thereto should be construed as belonging to the scope of the invention.

What is claimed is:

1. A display device comprising:
    a display panel; and
    a backlight unit comprising:
        a printed circuit,
        a light-emitting device on the printed circuit,
        a transparent film including a holographic film on a bottom surface of the transparent film facing the printed circuit, the holographic film including at least an optical pattern overlapping the light-emitting device and modifying an angle of a portion of light emitted by the light-emitting device,
        a light output pattern on an upper surface of the transparent film, the portion of light with the modified angle passing through the light output pattern toward the display panel, the light output pattern having a refractive index greater than a refractive index of the transparent film such that a refraction angle of the portion of light exiting the light output pattern is less than an incidence angle of the portion of light entering the light output pattern, and
        a coating layer on the transparent film, the coating layer having a refractive index lower than the refractive index of the transparent film.

2. The display device of claim 1, wherein the optical pattern modifies an angle of another portion of the light emitted by the light-emitting device, the coating layer reflecting the other portion of light with the modified angle toward the bottom surface of the transparent film.

3. The display device of claim 1, wherein the coating layer overlaps the light output pattern.

4. The display device of claim 3, wherein the portion of light with the modified angle passing through the light output pattern further passes through the coating layer.

5. The display device of claim 3, wherein an upper surface of the coating layer is flat.

6. The display device of claim 1, wherein an upper surface of the light output pattern is parallel to a lower surface of the light output pattern.

7. The display device of claim 1, further comprising:
    a cover bottom under the printed circuit; and
    an adhesive tape bonding the printed circuit to the cover bottom.

8. The display device of claim 1, further comprising:
    a reflection film that accommodates and exposes the light-emitting device, the reflection film having a height greater than a height of the light-emitting device and configured to reflect light emitted from the light-emitting device.

9. A display device comprising:
    a display panel; and
    a backlight unit comprising:
        a printed circuit,
        a light-emitting device on the printed circuit,
        a transparent film including a holographic film on a bottom surface of the transparent film facing the printed circuit, the holographic film including at least an optical pattern overlapping the light-emitting device and modifying an angle of a portion of light emitted by the light-emitting device, and
        a light output pattern on an upper surface of the transparent film, the portion of light with the modified angle passing through the light output pattern toward the display panel, the light output pattern having a refractive index greater than a refractive index of the transparent film such that a refraction angle of the portion of light exiting the light output pattern is less than an incidence angle of the portion of light entering the light output pattern,
    wherein the holographic film further comprises:
        a base film between the bottom surface of the transparent film and the optical pattern, the base film having a refractive index lower than a refractive index of the optical pattern.

10. The display device of claim 9, wherein the optical pattern is disposed in a lattice shape on a bottom surface of the base film.

11. The display device of claim 9, wherein the refractive index of the base film is equal to or lower than the refractive index of the transparent film.

12. The display device of claim 9, wherein the optical pattern is a diffraction pattern, the refractive index of the optical pattern greater than the refractive index of the transparent film.

13. A display device of claim 1 comprising:
a display panel; and
a backlight unit comprising:
a printed circuit,
a light-emitting device on the printed circuit,
a transparent film including a holographic film on a bottom surface of the transparent film facing the printed circuit, the holographic film including at least an optical pattern overlapping the light-emitting device and modifying an angle of a portion of light emitted by the light-emitting device, and
a light output pattern on an upper surface of the transparent film, the portion of light with the modified angle passing through the light output pattern toward the display panel, the light output pattern having a refractive index greater than a refractive index of the transparent film such that a refraction angle of the portion of light exiting the light output pattern is less than an incidence angle of the portion of light entering the light output pattern, wherein the light output pattern has an elliptical shape.

14. The display device of claim 13, wherein a semi-major axis of the elliptical shape equals a semi-minor axis of the elliptical shape.

15. The display device of claim 13, wherein a semi-major axis of the elliptical shape is greater than a semi-minor axis of the elliptical shape.

16. A display device comprising:
a display panel; and
a backlight unit comprising:
a printed circuit,
a light-emitting device on the printed circuit,
a transparent film including a holographic film on a bottom surface of the transparent film facing the printed circuit, the holographic film including at least an optical pattern overlapping the light-emitting device and modifying an angle of a portion of light emitted by the light-emitting device, and
a light output pattern on an upper surface of the transparent film, the portion of light with the modified angle passing through the light output pattern toward the display panel, the light output pattern having a refractive index greater than a refractive index of the transparent film such that a refraction angle of the portion of light exiting the light output pattern is less than an incidence angle of the portion of light entering the light output pattern,
wherein an upper surface of the light output pattern is parallel to a lower surface of the light output pattern, and
wherein the light output pattern has a trapezoidal shape.

17. A display device comprising:
a display panel; and
a backlight unit comprising:
a printed circuit,
a light-emitting device on the printed circuit,
a transparent film including a holographic film on a bottom surface of the transparent film facing the printed circuit, the holographic film including at least an optical pattern overlapping the light-emitting device and modifying an angle of a portion of light emitted by the light-emitting device, and
a light output pattern on an upper surface of the transparent film, the portion of light with the modified angle passing through the light output pattern toward the display panel, the light output pattern having a refractive index greater than a refractive index of the transparent film such that a refraction angle of the portion of light exiting the light output pattern is less than an incidence angle of the portion of light entering the light output pattern,
wherein the holographic film includes a first plurality of optical patterns in an area overlapping the light-emitting device and a second plurality of optical patterns in another area overlapping space between light-emitting devices, the first plurality of optical patterns having a density greater than a density of the second plurality of optical patterns.

18. A backlight unit comprising:
a printed circuit;
a light-emitting device on the printed circuit;
a transparent film including an optical pattern on a bottom surface of the transparent film facing the printed circuit, the optical pattern overlapping the light-emitting device and modifying an angle of a portion of light emitted by the light-emitting device;
a diffusion film on the transparent film;
a light output pattern on an upper surface of the transparent film and under the diffusion film, the portion of light having the modified angle passing through the light output pattern toward the diffusion film, the light output pattern having a refractive index greater than a refractive index of the transparent film such that a refraction angle of the portion of light exiting the light output pattern is less than an incidence angle of the portion of light entering the light output pattern; and
a coating layer between the transparent film and the diffusion film, the coating layer having a refractive index lower than the refractive index of the transparent film.

19. A backlight unit comprising:
a printed circuit;
a light-emitting device on the printed circuit;
a transparent film including an optical pattern on a bottom surface of the transparent film facing the printed circuit, the optical pattern overlapping the light-emitting device and modifying an angle of a portion of light emitted by the light-emitting device;
a diffusion film on the transparent film;
a light output pattern on an upper surface of the transparent film and under the diffusion film, the portion of light having the modified angle passing through the light output pattern toward the diffusion film, the light output pattern having a refractive index greater than a refractive index of the transparent film such that a refraction angle of the portion of light exiting the light output pattern is less than an incidence angle of the portion of light entering the light output pattern;
a color conversion sheet on the diffusion film; and
one or more optical sheets on the color conversion sheet.

20. A backlight unit comprising:
a plurality of light sources disposed on a printed circuit;
a reflection film disposed in at least an area different than another area in which the plurality of light sources is disposed on the printed circuit;
a light source protecting portion disposed on the plurality of light sources and the reflection film;

a transparent film disposed on the light source protecting portion; and a plurality of light blocking patterns disposed at positions corresponding to the plurality of light sources on a bottom surface of the transparent film, wherein an air gap is present between the plurality of light blocking patterns and the light source protecting portion, and wherein a thickness of a central portion in at least one of the plurality of light blocking patterns is greater than a thickness of a peripheral portion.

21. The backlight unit of claim 20, further comprising:

an adhesive layer disposed between the light source protecting portion and the transparent film, and wherein the adhesive layer is disposed in at least an area different than another area in which the plurality of light blocking patterns is disposed, and an edge of each of the plurality of light blocking patterns is separated away from the adhesive layer.

22. A backlight unit comprising:

a plurality of light sources disposed on a printed circuit;

a reflection film disposed in at least an area different than another area in which the plurality of light sources is disposed on the printed circuit;

a light source protecting portion disposed on the plurality of light sources and the reflection film;

a transparent film disposed on the light source protecting portion; and a plurality of light blocking patterns disposed at positions corresponding to the plurality of light sources on a bottom surface of the transparent film, wherein the plurality of light blocking patterns includes a first light blocking pattern disposed in a peripheral area of a display panel and a second light blocking pattern disposed in a central area of the display panel, and wherein a thickness of the first light blocking pattern is less than a thickness of the second light blocking pattern or an area of the first light blocking pattern is less than an area of the second light blocking pattern.

* * * * *